No. 836,549. PATENTED NOV. 20, 1906.
I. WATTS.
STEAM SEPARATOR.
APPLICATION FILED FEB. 18, 1905.

2 SHEETS—SHEET 1.

WITNESSES:
William Miller
Edward Wiesner

INVENTOR
Ira Watts
BY
W. C. Hauff
ATTORNEY

No. 836,549. PATENTED NOV. 20, 1906.
I. WATTS.
STEAM SEPARATOR.
APPLICATION FILED FEB. 18, 1905.

2 SHEETS—SHEET 2.

WITNESSES:
William Miller
Edward Wiesner

INVENTOR
Ira Watts
BY
W. C. Hauff
ATTORNEY

UNITED STATES PATENT OFFICE.

IRA WATTS, OF MOUNT VERNON, NEW YORK.

STEAM-SEPARATOR.

No. 836,549.  Specification of Letters Patent.  Patented Nov. 20, 1906.

Application filed February 18, 1905. Serial No. 246,268.

*To all whom it may concern:*

Be it known that I, IRA WATTS, a citizen of the United States, residing at Mount Vernon, county of Westchester, and State of New York, have invented new and useful Improvements in Steam Separators or Traps, of which the following is a specification.

This invention resides in certain novel features of construction set forth in the following specification and claims and illustrated in the annexed drawings, in which—

Figure 1:
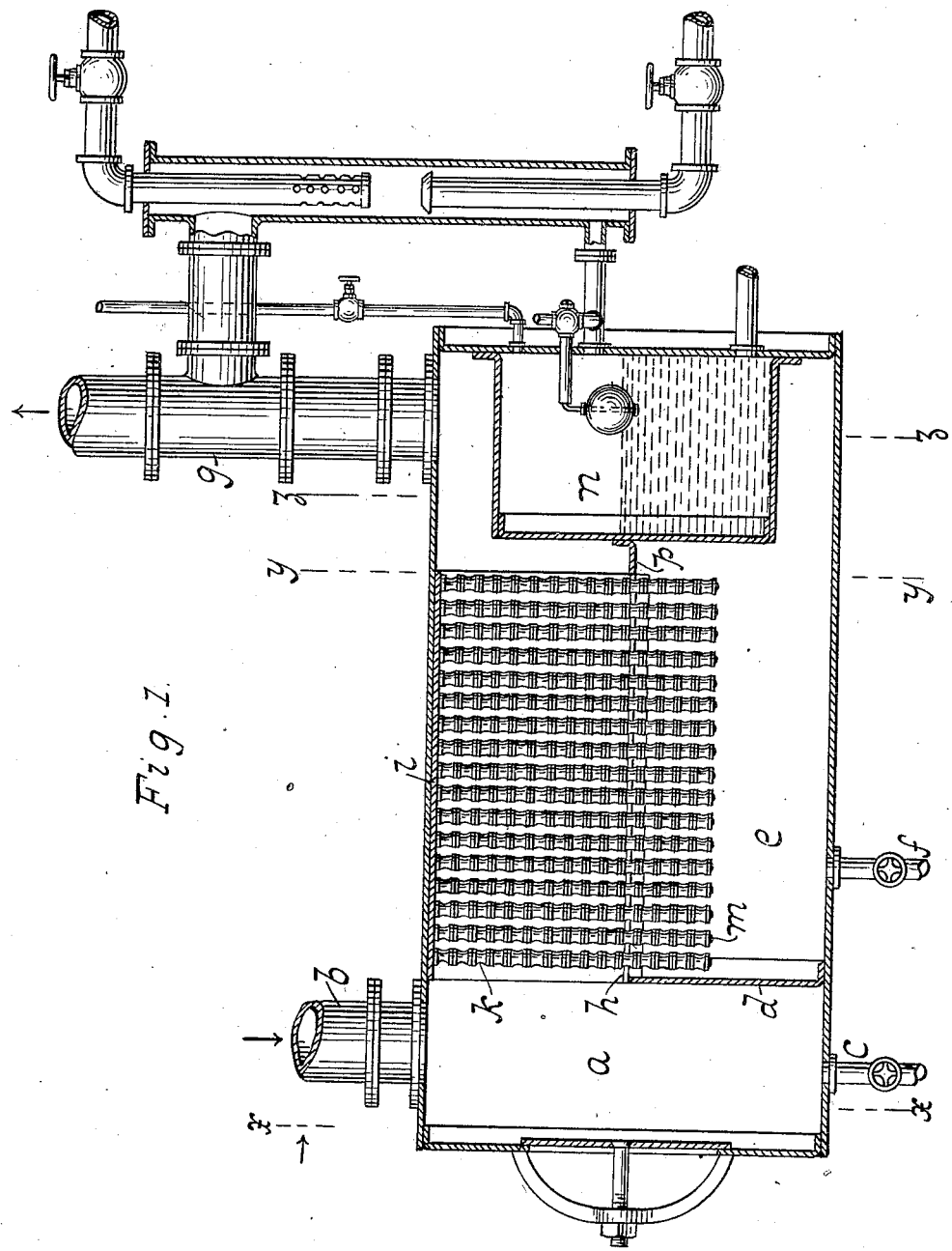
Figure 2:
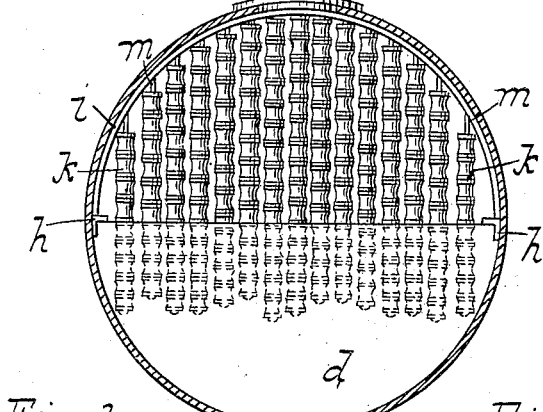
Figure 3:
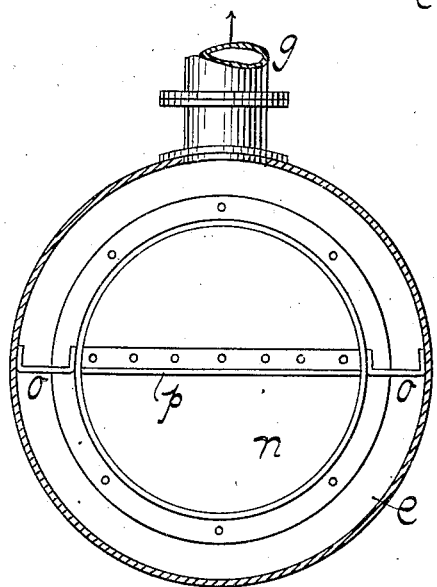
Figure 4:
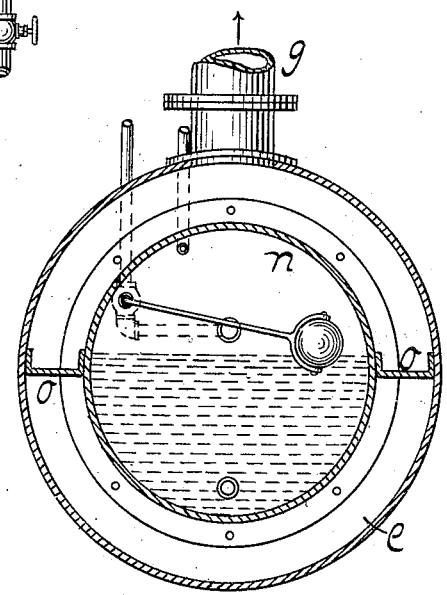
Figure 5:
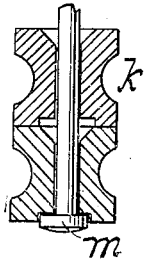
Figure 6:
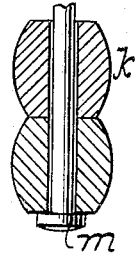

Figure 1 is a sectional side elevation of an apparatus embodying this invention. Fig. 2 is a section along $x\ x$, Fig. 1. Fig. 3 is a section along $y\ y$, Fig. 1. Fig. 4 is a section along $z\ z$, Fig. 1. Figs. 5 and 6 show baffles of various forms.

In the drawings is shown an expansion-chamber $a$ with inlet $b$ and outlet $c$. A partition $d$ is shown between this space or chamber and what may be called a "separating" chamber or compartment $e$, whose outlet $f$, like outlet $c$, runs to a trap or sewer or other point. An outlet $g$ leads to a heating system or to the atmosphere.

The separating-chamber is shown with ledges or supports $h$, which can be pieces of angle-iron or other suitable sustaining means. Frames or carriers $i$ are supported on ledges $h$ and are made to fit or conform to the top of the shell or wall of the separator. Suspended from the frames are a series of baffles $k$, carried by rods or wire ropes or other means $m$. These baffles are made of suitable material, such as porcelain or metal, and of suitable shape. The oblong shape, concave or convex, as shown, has been found to serve the purpose; but the invention is not confined to any particular shape. The ropes or suspending means $m$ are hung so that each will vibrate from the flow of steam. A concave shape is shown at $k$, Fig. 5, and a convex shape at $k'$, Fig. 6. These baffling devices extend below the top of the partition $d$, which separates the expansion and separating chambers, and is shown extended from the bottom up about half-way in the shell or chamber.

A receiving-tank is shown at $n$. This chamber or compartment $n$ can receive water from a heater or other source and being in the separator or surrounded by the steam thereof said compartment or its contents are protected against cooling or contact with the outer air. This chamber $n$ can serve as a feed-water heater or as a hot-water supply or for any suitable purpose. This tank $n$, as seen, has its contents shut off from the space in compartment $e$; but being entirely surrounded by the steam in such compartment the tank $n$ is kept thoroughly heated, and the heat of the steam in compartment $e$ is thus utilized. To prevent the water in tank $n$ rising above a certain level or above the point of inlet into said tank, an automatic or float valve can be applied; but these float-valves are well known and form no part of this invention.

A partition $o$ is shown between the receiving-compartment and the separating-chamber. This partition is extended from the outer side of the receiving tank or compartment $n$ to the inner side of the shell or separating-chamber. A baffle or ledge $p$ extends from the tank into the separating-chamber. These partitions $o$ and baffle $p$ prevent dirty steam from mingling with the clean steam. The steam in rising from below toward the outlet $g$ will strike the projections $o\ p$ and the dirt or impurities will be there arrested or thrown back, while the steam rises or passes on. Steam entering at inlet $b$ and depositing oil or other matter at the baffles or parts $k$, $o$, and $p$ is cleaned or purified by the time it passes off at outlet $g$.

What I claim as my invention, and desire to secure by Letters Patent, is—

1. In a steam-separator an expansion-chamber with inlet and outlet, a separating chamber or compartment communicating with the expansion-chamber and extended down to a level with the bottom thereof, a partition for the lower part of the expansion-chamber and made to separate the bottoms of the same and of the separating-chamber, and outlets for the separating-chamber.

2. In a steam-separator an expansion-chamber with inlet and outlet, a separating-chamber having a continuous bottom with the expansion-chamber and provided with vibrating baffling devices, a partition rising from said continuous bottom for separating the lower part of the separating-chamber from the expansion-chamber, outlets for the separating-chamber and a receiving-compartment in the separator said receiving-compartment being separated from the separating-chamber and surrounded by the steam thereof.

3. In a steam-separator a separating-chamber with supporting-frames, and vibrating baffling devices consisting of rods or like suspending means depending from the frame toward the bottom or lower part of the separator, and suitably-shaped baffles of porcelain or suitable material about the suspending means.

4. In a steam-separator a receiving-tank in the separator at one end thereof so as to have one end of the tank formed by the head of the separator and to leave the rest of the tank free to be surrounded by steam, partitions between the tank and separator to form upper and lower compartments, a ledge or baffling projection extended from the tank, and bafflers suspended in the separator.

In testimony whereof I have hereunto set my hand in the presence of two subscribing witnesses.

IRA WATTS.

Witnesses:
GEORGE F. SCHOFIELD,
W. C. HAUFF.